United States Patent [19]
Castelnuovo

[11] Patent Number: 5,452,606
[45] Date of Patent: Sep. 26, 1995

[54] APPARATUS FOR MEASURING WHEEL POSITIONS ON A VEHICLE

[75] Inventor: Marco Castelnuovo, Milan, Italy

[73] Assignee: Hofmann Wernstatt-Technik GmbH, Germany

[21] Appl. No.: 281,977

[22] Filed: Jul. 29, 1994

Related U.S. Application Data

[63] Continuation of Ser. No. 962,335, Oct. 16, 1992, abandoned.

[30] Foreign Application Priority Data

Oct. 17, 1992 [DE] Germany ............................ 41 34 411.1

[51] Int. Cl.⁶ .................................................... G01B 5/24
[52] U.S. Cl. ......................... 73/118.1; 33/203; 33/203.18
[58] Field of Search ........................... 73/118.1; 364/559; 33/203, 203.12, 203.13, 203.15, 203.17, 203.18

[56] References Cited

U.S. PATENT DOCUMENTS 4,615,618 10/1986 Bailey et al. ..................... 33/203.18 X
4,977,524 12/1990 Strege et al. ......................... 33/203 X Primary Examiner—Richard E. Chilcot, Jr.
Assistant Examiner—Eric S. McCall
Attorney, Agent, or Firm—Cushman Darby & Cushman

[57] ABSTRACT

A method and apparatus for measuring wheel positions on a vehicle involving measurement of certain angular positions of the vehicle wheel comprises measuring a plurality of different vertical spacings of a part of the body of the vehicle from the center of the wheel, and the wheel positions associated therewith. The measurement values are related to each other to determine a dependency of the position of the wheel on the level which is ascertained in that way.

1 Claim, 3 Drawing Sheets

APPARATUS FOR MEASURING WHEEL POSITIONS ON A VEHICLE

This is a continuation of application Ser. No. 07/962,335, filed on Oct. 16, 1992, abandoned, Jul. 29, 1994.

BACKGROUND OF THE INVENTION

In motor vehicles, in particular vehicles driven by an on-board engine, which have active and/or semi-active wheel suspension arrangements by means of which the ground clearance of the vehicle, or the distance between the underside of the vehicle and the ground on which it is disposed, is variably adjustable, it is necessary to determine the level of the vehicle, in order to achieve correct geometrical wheel position values. The level of the vehicle is defined by the difference in height of a part of the vehicle which is supported in sprung relationship on a wheel of the vehicle, for example the chassis of the vehicle, relative to an unsprung part of the vehicle, for example a suspension member which is directly connected to the respective wheel.

Reference will be made at this point to FIGS. 1 and 2 of the accompanying drawings to illustrate this point in connection with a wheel suspension arrangement for a motor vehicle wheel.

Referring therefore to FIGS. 1 and 2, reference numeral 14 identifies an unsprung suspension member 14 of the wheel suspension assembly, which supports a wheel hub assembly 16. An upper strut or suspension link 15 and a lower strut or suspension link 13 of the wheel suspension arrangement are pivotally connected to the suspension member 14. Reference numeral 12 identifies a sprung part of the vehicle, for example the chassis structure thereof, which is supported by the two struts or suspension links 13 and 15, by virtue of the latter being pivotally connected to the part 12 of the vehicle, with the suitable interposition of springs, dampers and the like (not shown), on the suspension member 14 which carries the wheel hub assembly 16. The level of the vehicle which is indicated at a in FIG. 1 is defined by the difference in height (h1–h2) of a pivot mounting point 6 for the sprung part 12 of the vehicle to the lower suspension link 13 and a pivot mounting point 7 of the lower suspension link 13 to the unsprung suspension member 14, in each case in relation to the ground 17 on which the wheel 1 is supported. When the wheel suspension arrangement and the wheel 1 are loaded with the normal weight of the spring-suspended part 12 of the vehicle, the components of the wheel suspension arrangement and the wheel 1 occupy the position shown in FIG. 1.

If the vehicle and in particular the chassis thereof is loaded with an additional weight, the components of the wheel suspension arrangement and the wheel 1 assume the positions shown in FIG. 2, by virtue of a downed movement of the chassis relative to the ground 17 on which the wheel 1 is supported. It will be seen that not only does that cause a change in the level of the vehicle as defined by the height difference h1–h2, but that there is also a change in the position of the wheel 1, for example the camber angle c.

The wheel suspension arrangement is intended to be designed in such a way that the wheel enjoys good contact with the surface on which it is disposed, under all possible driving conditions, so that the desired road-holding qualities of the vehicle are maintained. In order to ensure that, the wheel position must adapt to the movements of the wheel suspension arrangement, in regard to all the wheel position parameters (tracking, camber, trail or caster and steering swivel inclination). That is effected on the basis of certain laws which are established by virtue of the dimensions and the arrangement of the kinematic components of the wheel suspension arrangement. Depending on the respective requirements which the vehicle manufacturer seeks to fulfil in terms of the road-holding qualities of the vehicle, the wheel suspension arrangements of different vehicles differ greatly from each other in regard to their geometrical data. In most cases, the geometrical data involved are not known to the workshops which have to carry out maintenance operations on such vehicles. Even if the geometrical data in question are known, the geometrical performance of the wheel suspension arrangement, as a function of different levels of the vehicle, in consideration of loading and other factors, is not known. Accordingly the vehicle manufacturers provide correlation tables which contain the dependency of the wheel positions, more particularly wheel angle positions, on the level of the wheel suspension arrangement, and also set out reference values at which wheel positions and in particular angular positions are to be measured.

Besides the foregoing problems there is the point that the operation of ascertaining the level of the suspension arrangement, which involves measuring the spacing of the wheel suspension arrangement from the ground on which the wheel is disposed, gives rise to difficulties in ordinary workshops, in particular as regards the accuracy which can be achieved in such a measuring operation. In general the position in respect of height of the ground or floor surface on which the wheel is supported cannot be accurately ascertained in an inspection pit as inspection pits are generally provided with upwardly projecting safety edges which constitute an impediment to accurate measurement. It is therefore generally necessary to rely on notional horizontal planes for carrying out the measurement operations. There is therefore not a standardised measuring method and the individual workshops manage with such difficulties, as best they can.

SUMMARY OF THE INVENTION

An object of the present invention is to provide a universal measurement method for ascertaining a vehicle level so that same can be reproducibly taken into consideration in a wheel position measurement operation.

Another object of the present invention is to provide a method of measuring wheel positions on a motor vehicle, such as angular positions, which can provide highly reliable measurement results and which can be readily employed in relation to a wide range of different vehicle designs.

Still another object of the present invention is to provide a method of measuring angular wheel positions on a motor vehicle, which can be readily carried into effect in relation to well-established reference or datum positions that are generally easily accessible.

A further object of the present invention is to provide an apparatus for determining wheel positions on a motor vehicle, which can be integrated without difficulty into conventional wheel position measuring systems.

Still a further object of the present invention is to provide an apparatus for determining angular wheel positions on a motor vehicle which can be easily fitted to a vehicle at a readily accessible position.

In accordance with the principles of the present invention the foregoing and other objects are achieved in a first aspect by a method of measuring wheel positions on a motor vehicle, for example for measuring given angular positions of a motor vehicle wheel, wherein for the purposes of determining the level of the vehicle, a plurality of different vertical spacings of a part of the body of the vehicle from the center of the wheel, and the wheel positions associated therewith are measured. The measurement values are related to each other to define a dependency in respect of the wheel position on the respective level.

In a second aspect of the invention the foregoing and other objects are achieved by an apparatus for determining wheel positions on a motor vehicle, comprising a detector for effecting angular measurement operations, which detector is adapted to be fixed to the motor vehicle wheel whose positions are to be measured, by way of a suitable adaptor device. The apparatus further includes a spacing measuring means for measuring an at least substantially vertical spacing between the center of the wheel whose position is to be measured and a part of the body of the vehicle.

Thus, the invention provides measurement of a plurality of different vertical spacings of a body part of the vehicle such as the outside edge of the mudguard or fender of the vehicle, from the center of the wheel or wheel axis, and the wheel positions, in particular angular positions, which are associated therewith. Those different vertical spacings can be brought about for example by the body of the vehicle being loaded to different degrees. In that operation, account can be taken of the reference values which are preset by the vehicle manufacturers in the tables that they issue. The measurement values obtained are then related to each other in order to ascertain a dependency of the position of the wheel, on the level of the vehicle. In that way it is possible to determine the correlations between the level of the vehicle and the position of the wheel, in accordance with the specifications from the vehicle manufactures. It is also possible however generally to ascertain the dependency of the position of the wheel on the level of the vehicle, for any type of vehicle, without the data from the vehicle manufacturers.

As will be seen in greater detail hereinafter, the measurement operation involves using the center of rotation of the wheel, or the axis of the wheel, for determining the position of the unsprung components of the wheel suspension arrangement. A part of the vehicle body which is disposed thereabove in an at least substantially vertical direction, more particularly the outside edge of the mudguard or fender, is employed as the measurement point in relation to the sprung components of the wheel suspension arrangement. The wheel axis can be readily ascertained by means of a conventional adaptor with which the detector for detecting the wheel positions and more particularly angular positions is fixed to the wheel in question. The level measurement operation can therefore be readily integrated into the measuring procedure which involves measurement of the wheel position.

The operation of determining the level of the vehicle is carried out using a spacing measuring assembly for ascertaining the vertical spacing between the center of the wheel which is defined by the detector secured to the wheel by way of the above-mentioned adaptor or by means of a component of the adaptor itself, and the above-mentioned sprung part of the vehicle such as a part of the body thereof. The detector and the adaptor are fixed to the vehicle wheel in centered relationship. A self-centering adaptor may be of assistance in that respect.

The detector to which the spacing measuring means is coupled is a detector for wheel position measurement, for example for measuring one or more of the wheel position parameters comprising tracking, camber, steering swivel inclination and trail or caster. It is possible for example to use any suitable detectors such as more particularly those described in patent application Ser. No. 07/802,645 (U.S. Pat. No. 5,208,647) and patent application Ser. No. 07/822,014 (U.S. Pat. No. 5,291,264) to which reference is accordingly directed for incorporation of the disclosure thereof into this specification.

Further objects, features and advantages of the present invention will be apparent from the following description of a preferred embodiment.

DESCRIPTION OF THE PREFERRED EMBODIMENT

Figure 1:
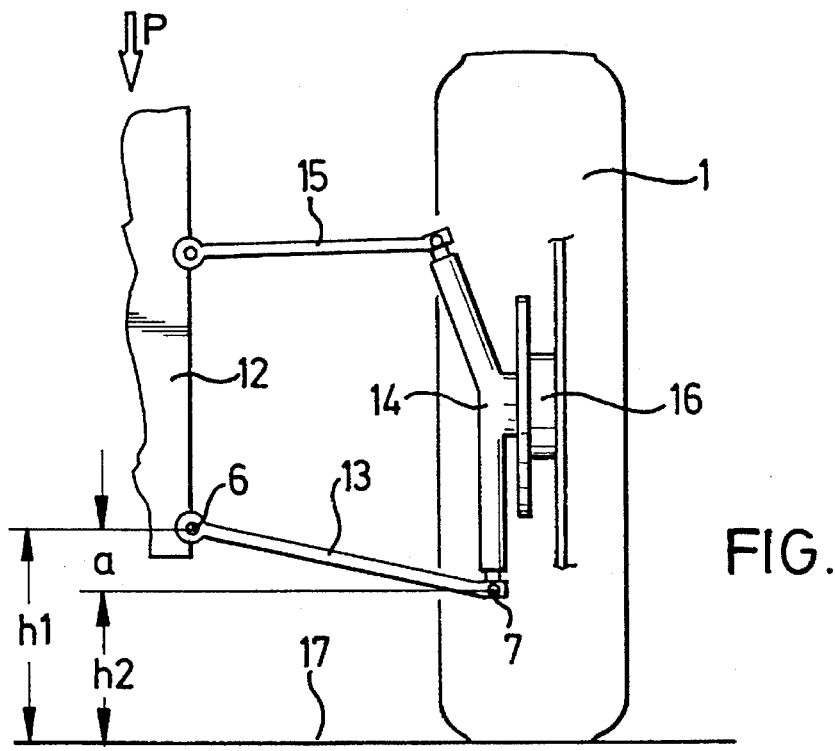
FIG. 1 is a diagrammatic view showing the position of a wheel with associated wheel suspension arrangement, with a normal vehicle loading.
Figure 2:
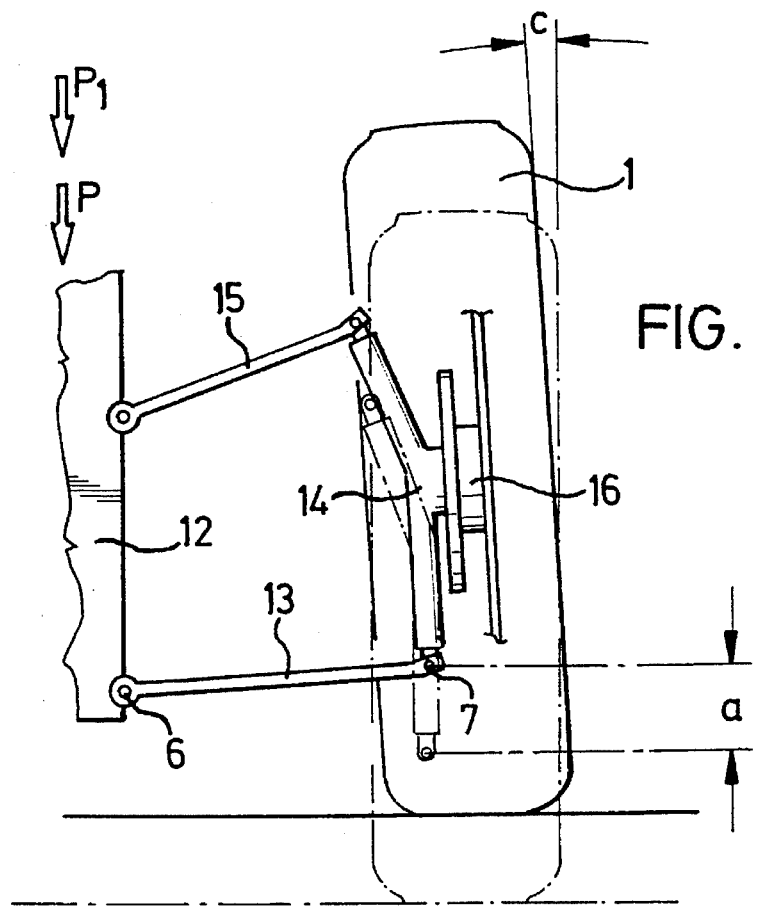
FIG. 2 shows the structure of FIG. 1 with an increased loading on the vehicle.
Figure 3:
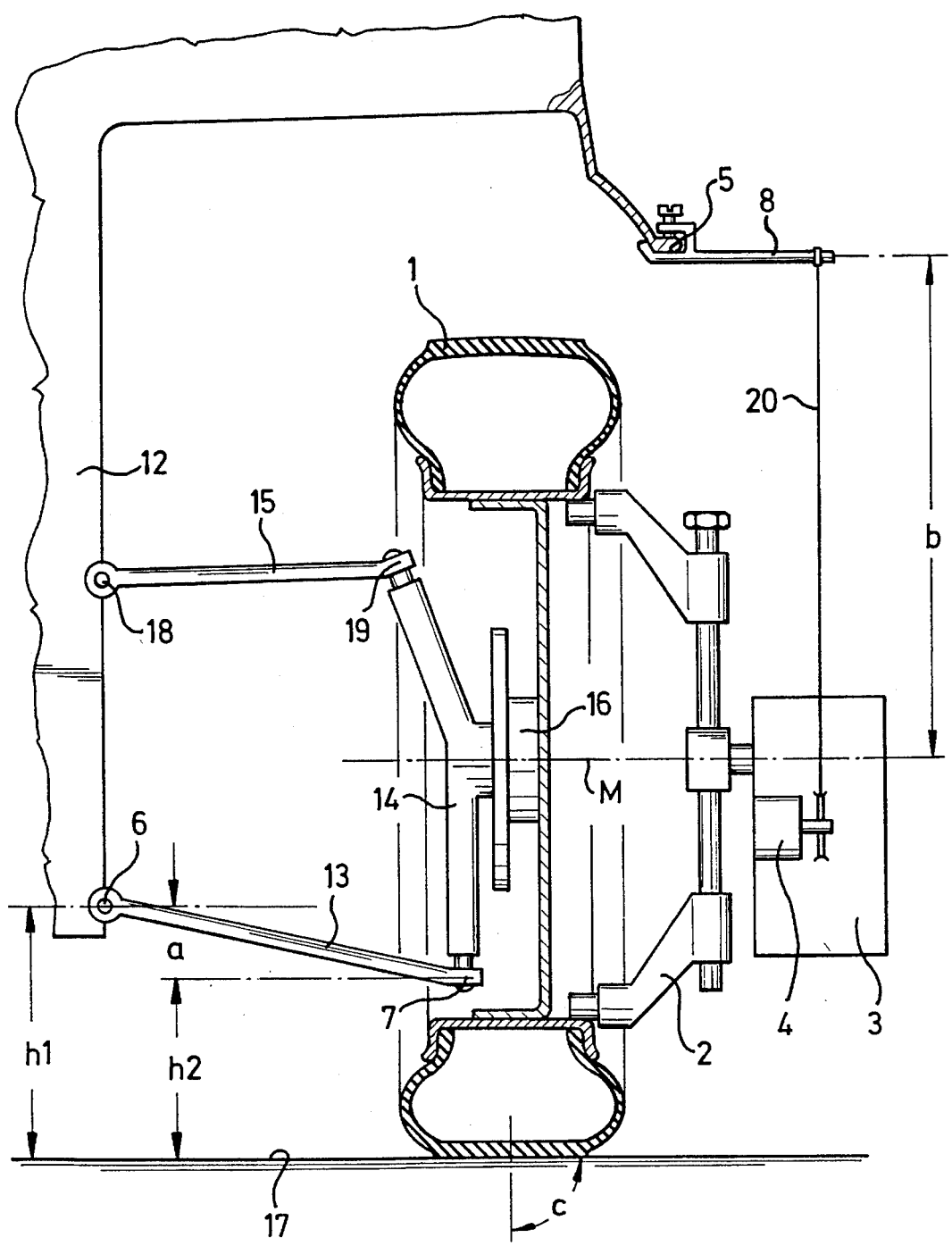
FIG. 3 shows a measuring arrangement constituting an embodiment of the invention.

FIGS. 1 and 2 already having been described above to illustrate the circumstances involved, reference will now be made to FIG. 3 showing a motor vehicle wheel indicated generally at 1, comprising a disk wheel with a pneumatic tire fitted thereon. A wheel suspension arrangement is provided in the usual way for definedly mounting and guiding the wheel 1 relative to the main part of the vehicle itself, for example the chassis structure, which is referred to hereinafter as the sprung part 12 of the vehicle. The wheel suspension arrangement is diagrammatically shown in FIG. 3 and comprises an upper strut or suspension link 15 and a lower strut or suspension link 13. The upper suspension link 15 is pivotally mounted to the sprung part 12 of the vehicle at a pivot mounting location 18 and to an unsprung part 14 of the wheel suspension arrangement, at a pivot mounting location 19. Similarly, the lower suspension link 13 is pivotally mounted to the sprung part 12 of the vehicle at a pivot mounting location 6 and to the unsprung part 14 of the suspension arrangement, at a pivot mounting location 7. The unsprung part 14 also carries a wheel hub assembly 16 to which the vehicle wheel 1 is fixed in known manner. The wheel hub assembly 16 defines a wheel axis as indicated at M, which forms the center of rotation for rotary movement of the wheel 1.

A detector 3 is fixed to the motor vehicle wheel 1 in defined relationship relative to the wheel axis M by way of a diagrammatically indicated adaptor 2 which can be of a generally known configuration and which can possibly also be a self-centering adaptor. The detector 3 is of any suitable construction, for example of the kinds referred to above, and serves to measure the position of the wheel 1, for example to measure the camber angle as indicated at c. However it may also serve to measure further wheel position angles, such as for example tracking, caster and steering swivel inclination.

A spacing sensor 4 is coupled to the detector 3 so that the spacing sensor 4 also occupies a defined position, relative to the wheel axis M. The spacing sensor 4 can be disposed in the housing of the detector 3. A suitable form of spacing sensor is a potentiometer, such as more particularly a rotary potentiometer, which is connected by way of a wire diagrammatically indicated at 20 to a reference element 8 for example in the form of a rod or bar. The reference element 8 is adapted to be fixed to a portion of the vehicle which is rigidly connected to the main sprung part 12 of the vehicle, more especially a portion of the body of the vehicle such as the outside edge of the mudguard or fender, as indicated at 5, which is disposed at least substantially vertically above the wheel axis M. The reference element 8 can be fixed in position for example by means of a fixing screw. The extension length of the wire 20 which is detected by the spacing sensor 4 is a measurement in respect of the vertical spacing as indicated at b between the outside edge of the mudguard or fender and the wheel axis M. Through the presence of the wheel hub assembly 16 and the suspension member 14, the wheel axis M is at a constant spacing from the pivot mounting location 7, in respect of which the spacing h2 from the ground 17 is a crucial consideration in the operation of determining the level of the vehicle.

In addition, the part of the vehicle body to which the reference element 8 is connected and which is disposed at a vertical spacing above the wheel axis M, being therefore for example the outside edge of the mudguard or fender, is rigidly connected in relation to the pivot mounting location 6 which is the determining consideration in regard to the spacing hi from the ground 17.

It will be seen therefore that, by determining the vertical spacing b between the wheel axis M and the sprung part of the vehicle such as the outer edge 5 of the mudguard or fender, it is possible to obtain a dimension which is proportional to the level of the vehicle as indicated at a and which is equal to (h1–h2). An electrical signal which is proportional to the spacing b, that is to say the level a, can be produced by the spacing sensor 4, and will then be subjected to further processing, as will be described in greater detail hereinafter.

Instead of an extensible wire 20 or a cord between the reference element 8 and the spacing sensor 4 which in the illustrated embodiment is in the form of a potentiometer, the spacing measuring means may also be in the form of an optical spacing measuring means using mirrors and light sources, in which case for example the reference element 8 is represented by a mirror. In that case, insofar as they are suitable for length measurement, the measuring principles described in above-mentioned patent application Ser. No. 07/802,645 (U.S. Pat. No. 5,208,647) and patent application Ser. No. 07/822,014 (U.S. Pat. No. 5,291,264) can be used.

Accordingly, the level a=(h1–h2) and also the wheel position can be ascertained by the measuring assembly illustrated in FIG. 3. In that respect level measurement is an integral component of the wheel position measurement procedure. The level measuring assembly comprising the components 4, 8 and 20 constituting the spacing measuring means can be completely integrated into the measuring arrangement of the detector 3.

The illustrated measuring arrangement can be used to ascertain different level values, in relation to different vehicle loadings. The various measurements can be carried out, having regard to the vehicle manufacturer specifications, in which respect it is possible to keep to certain reference data in respect of the vehicle loading and/or various vehicle level values $a_0, a_1 \ldots a_n$.

It is also possible however, irrespective of the vehicle manufacturer reference data, generally to determine different values $b_0, b_1 \ldots b_n$ in respect of the vehicle level (h1–h2), as universally applicable values.

As was seen above in relation to FIGS. 1 and 2, it is not only the vehicle level values but also the wheel position values and more especially the wheel angle values that change. FIG. 2 shows the change in the camber angle c. The change in the wheel position is detected by the detector 3.

Figure 4:
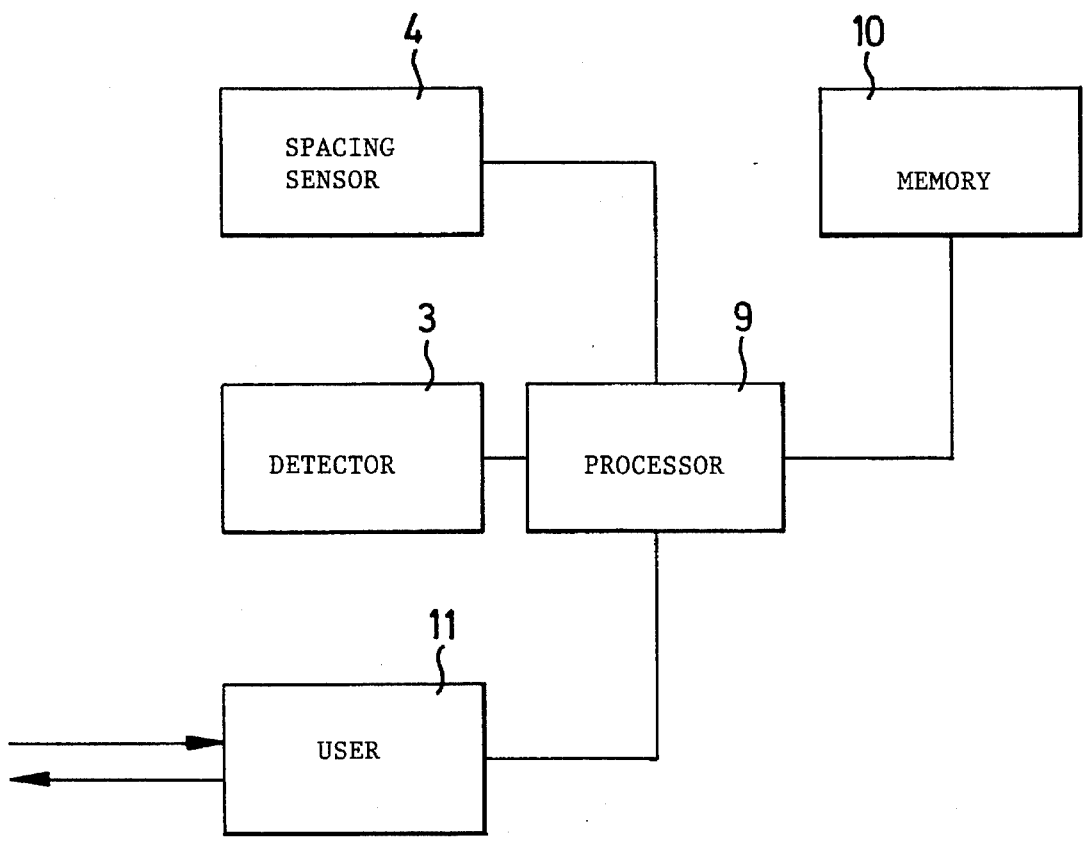
FIG. 4 shows a block circuit diagram for evaluation of the signals obtained with the measuring arrangement shown in FIG. 3.

The values $a_0, a_1 \ldots a_n$ or $b_0, b_1 \ldots b_n$ which are supplied by the spacing sensor 4 and which are proportional to the level of the vehicle, and the wheel position values $c_0, c_1 \ldots c_n$ and $d_0, d_1 \ldots d_n$ supplied by the detector 3 are passed to a computer or processor as indicated at 9 in FIG. 4, for further processing thereof. References $d_0, d_1 \ldots d_n$ identify the angle values which do not correspond to the angle values which are preset by the vehicle manufacturer, but which occur in each case with any variations in level $b_0, b_1 \ldots b_n$. The values which are preset by the vehicle manufacturer, for different levels $a_0 \ldots a_n$ and wheel positions $c_0 \ldots c_n$ can also be held in a store or memory 10 connected to the computer 9.

The computer 9 can for example carry out the following computation operations:

$$x=a/b$$

thereby giving the relationship between the level value specified by the manufacturer and the freely measured level value;

$$y=c/a$$

thereby giving the relationship between the wheel position specified by the manufacturer and the level value specified by the manufacturer; and $$z=d/b$$

thereby giving the relationship between the freely measured wheel position and the freely measured level position.

It is also possible to determine the relationship between a change in the position of the wheel and a change in the level of the vehicle, in which case the level and wheel position values specified by the vehicle manufacturer can be used and/or the freely measured universal values can be employed. It is possible for example to compute the following relationships or correlations:

$$yln=(cn-c1)/(an-a1)$$

or $$zln=(dn-d1)/(bn-b1)$$

The various correlation values which are produced by the computer 9 can also be held in the memory 10 or in a separate store or memory and are available for a further measurement value assessment operation.

As shown in FIG. 4, the user can communicate with the computer 9 by way of an interface 11. For that purpose the user may employ a suitable input means such as an input keyboard. A printer or other display means such as a display screen can be suitably connected to the computer 9 by way of the interface 11. When using the abovementioned parameters x, y, z and the correlations between the change in wheel position and the change in level, and with the specifications from the vehicle manufactures and also with the values which can be measured in a workshop or generally, it is possible to determine the dependency and more particularly the non-linear dependency of the wheel position on the vehicle level, and store it for example in the memory 10. Those correlations can then be used again for further measurement operations in relation to the respective specific types of vehicles.

In a preferred procedure the measurement operations may be carried out at at least first, second and third different spacings between the part of the body and the center of the respective wheel.

It will be appreciated that the above-described method and apparatus according to the invention have been set forth solely by way of example and illustration of the principles of the invention and that various modifications and alterations may be made therein without thereby departing from the spirit and scope of the invention.

I claim:

1. An apparatus for determining wheel positions of a vehicle wheel on a vehicle having a body, comprising:

(a) a detector for measuring angular wheel position characteristics;

(b) a mounting adaptor for mounting said detector to said vehicle wheel;

(c) a spacing measuring means for measuring a vertical spacing between an axis of rotation of said vehicle wheel and a reference point on said vehicle body, said spacing measuring means being coupled to said detector;

(d) a computing unit operatively connected to said spacing measuring means and to said detector, said computing unit determining a relationship between the measured vertical spacing and a corresponding angular wheel position characteristic so that angular wheel positions can be determined relative to a given vertical spacing; and (e) an extensible measuring element spanning between said spacing measuring means and said reference point on the vehicle body.

* * * * *